United States Patent
Hood, III et al.

[11] Patent Number: 6,038,128
[45] Date of Patent: Mar. 14, 2000

[54] COMPUTER AND COMPUTER/DOCKING ASSEMBLY WITH IMPROVED INTERNAL COOLING

[75] Inventors: Charles D. Hood, III, Cedar Park; James Utz, Pflugerville, both of Tex.

[73] Assignee: Dell U.S.A., L.P., Round Rock, Tex.

[21] Appl. No.: 09/115,210

[22] Filed: Jul. 14, 1998

[51] Int. Cl.[7] .................................................. H05K 7/20
[52] U.S. Cl. ........................ 361/687; 174/15.2; 361/695; 361/700
[58] Field of Search .................. 174/15.2; 361/686–687, 361/695–697, 700, 701, 703; 454/184

[56] References Cited

U.S. PATENT DOCUMENTS

| | | | |
|---|---|---|---|
| 5,339,214 | 8/1994 | Nelson | 361/695 |
| 5,552,960 | 9/1996 | Nelson et al. . | |
| 5,634,351 | 6/1997 | Larson et al. . | |
| 5,694,292 | 12/1997 | Paulsel et al. | 361/687 |
| 5,694,294 | 12/1997 | Ohashi et al. | 361/687 |
| 5,704,212 | 1/1998 | Erler et al. | 361/687 |
| 5,713,790 | 2/1998 | Lin | 361/695 |
| 5,768,101 | 7/1998 | Cheng | 361/687 |
| 5,852,547 | 12/1998 | Kitlas et al. | 361/695 |

*Primary Examiner*—Gregory Thompson
*Attorney, Agent, or Firm*—Haynes and Boone, L.L.P.

[57] ABSTRACT

A portable computer and a docking assembly for the computer according to which improved cooling is provided for the computer. To this end, an air flow path is established in the computer chassis that extends from an inlet formed in the chassis, through the chassis, and out an outlet formed in the chassis. In the undocked mode of the computer, ambient air is passed into the chassis and in the flow path to remove heat from the chassis. When the computer is docked to a docking device, cool air from the docking device is passed into the computer chassis and in the flow path to remove heat from the chassis.

28 Claims, 2 Drawing Sheets

COMPUTER AND COMPUTER/DOCKING ASSEMBLY WITH IMPROVED INTERNAL COOLING

TECHNICAL FIELD

This disclosure relates generally to a computer and a computer docking assembly, and, more particularly, to a portable computer and a docking assembly which together provide improved cooling for the computer in the docked mode of the computer.

BACKGROUND

With the performance capabilities of portable computers, such as notebooks, laptops, and the like, ever increasing, they are becoming more popular both for use in a undocked mode and in a docked mode in which they are clocked to a docking device, such as a port replicator, a docking station, or the like. Thus, it becomes essential to dissipate the heat generated by components within the computer during operation to insure that they remain within their allowable operating temperature ranges since, otherwise, the components could fail prematurely or general malfunction could occur. This is especially true in connection with the computer's processor which generates heat in proportion to increases in its speed, and is also true of other system components including video controllers and memory.

One of the most effective techniques currently being utilized to dissipate heat from a computer is to provide an internal fan to directly apply a relatively high velocity air across the surface of the internal components, or heat sinks associated with the components. This raises the convective heat transfer coefficient for the surface of the internal components, thereby increasing the convection cooling. Although this cooling scheme is effective, the maximum heat dissipation is limited by the size of the fan and the size of the heat sink/heat exchanger that will fit into the computer, especially a portable computer. There is also a practical limit to the power available from a battery to drive the internal fan.

Therefore, what is needed is a portable computer and a computer docking assembly according to which improved cooling is provided for the computer without the need for increasing the size of the fan and/or the heat sink/heat exchanger.

SUMMARY

Accordingly, an embodiment of the present invention is directed to a portable computer and a docking assembly for the computer according to which improved cooling is provided for the computer. To this end, an air flow path is established in the computer chassis that extends from an inlet formed in the chassis, through the chassis, and out an outlet formed in the chassis. In the undocked mode of the computer, ambient air is passed into the chassis and in the flow path to remove heat from the chassis. When the computer is docked to a docking device, cool air from the docking device is passed into the computer chassis and in the flow path to remove heat from the chassis to provide additional cooling of the computer.

Advantages are thus achieved with the portable computer of the present disclosure since it is provided with an internal cooling system that cools the computer in its undocked, operating mode and can be utilized to permit additional cooling when the computer is docked.

DETAILED DESCRIPTION OF THE PREFERRED EMBODIMENT

Figure 1:
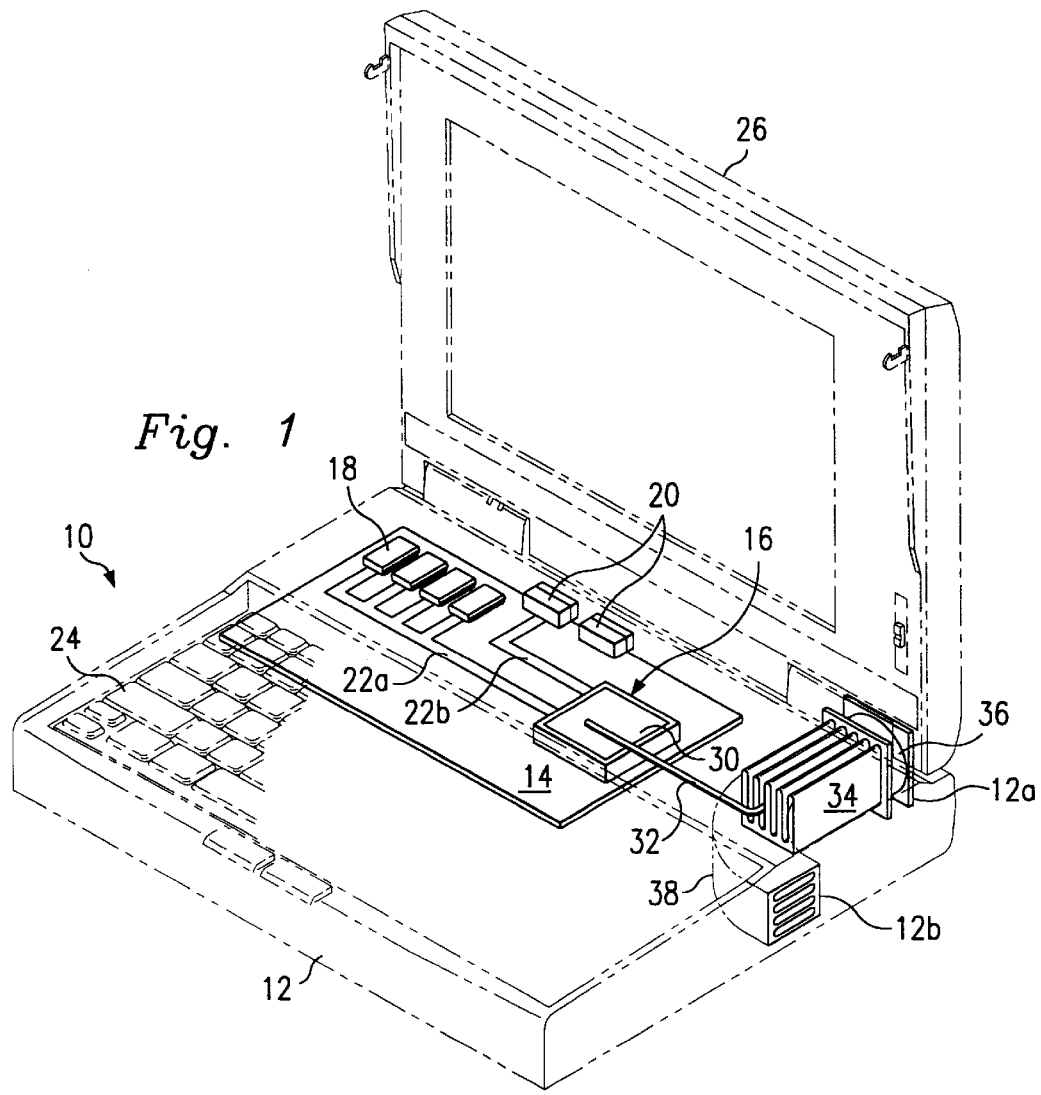
FIG. 1 is an isometric view of the portable computer according to an embodiment of the present invention with a portion of the upper cover/keyboard being removed.

Referring to FIG. 1 of the drawings, the reference numeral 10 refers, in general, to a portable computer according to an embodiment of the present invention, which can be a laptop computer, a notebook computer, or the like. The computer 10 includes a chassis 12 (shown in phantom lines) in which a motherboard 14 is mounted. A processor 16, four memory modules 18, and two input/output (I/O) devices 20 are mounted on the motherboard 14. Buses 22a and 22b are also provided on the motherboard 14 that connect the processor 16 to the memory modules 18 and to the input/output devices 20, respectively.

Figure 2:
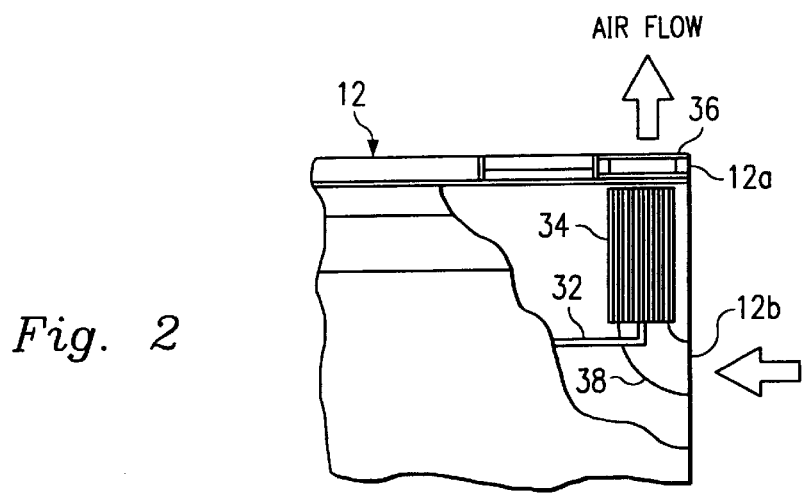
FIG. 2 is a top plan view of a portion of the computer of FIG. 1 depicting an air flow path.

A keyboard 24 forms at least a portion of the upper surface of the housing, and a cover 26 is hinged to the rear end portion of the chassis 12 in any known manner, and can be moved between the open position shown and a closed position shown partially in FIG. 2 in which it covers the upper surface of the chassis, including the keyboard 24. Although not shown in the drawings, it is understood that a hard drive unit, a battery and other components, electrical traces, electrical circuits and related devices are also provided in the chassis 12. Since all of the above is conventional, it will not be described in any further detail.

The processor 16 includes a housing 30, preferably formed by a sheet metal cap and a printed circuit board. A heat pipe 32 has a portion extending in the processor housing 30 and a portion projecting from a side wall of the housing. A heat sink 34 is mounted in the chassis 12 in a corner adjacent a rear wall and a sidewall of the chassis and receives a portion of the heat pipe 32 between two adjacent fins.

A muffin fan 36 is mounted in an outlet 12a in the rear wall of the chassis 12 just behind the heat sink 34. An air duct 38 is disposed in the chassis 12 and has an inlet extending flush with an inlet 12b formed in the latter sidewall of the chassis. The air duct 38 bends for ninety degrees in the chassis 12 and extends to the heat sink 34.

When the computer 10 is in a non-docked mode, heat generated by the processor 16 is transferred in a heat flow path via the heat pipe 32, to the heat sink 34. The fan 36 operates in a normal mode in which it pulls ambient air into and through the inlet 12b, as shown by the flow arrow in FIG. 2. The air then passes in an air flow path from the inlet 12b, into and through the air duct 38, across the heat sink 34 and out of the housing through the outlet 12a.

As a result of the above heat and air flow paths, heat generated by the processor 16 is transferred to, and dissipated by, the heat sink 34 and transferred to the air flowing past the heat sink before the air is exhausted from the chassis 12 to the atmosphere. It is understood that the fan 36 can also operate in a mode in which its blade rotation is reversed to pass air in a direction opposite to that described above for reasons to be described.

Figure 3:
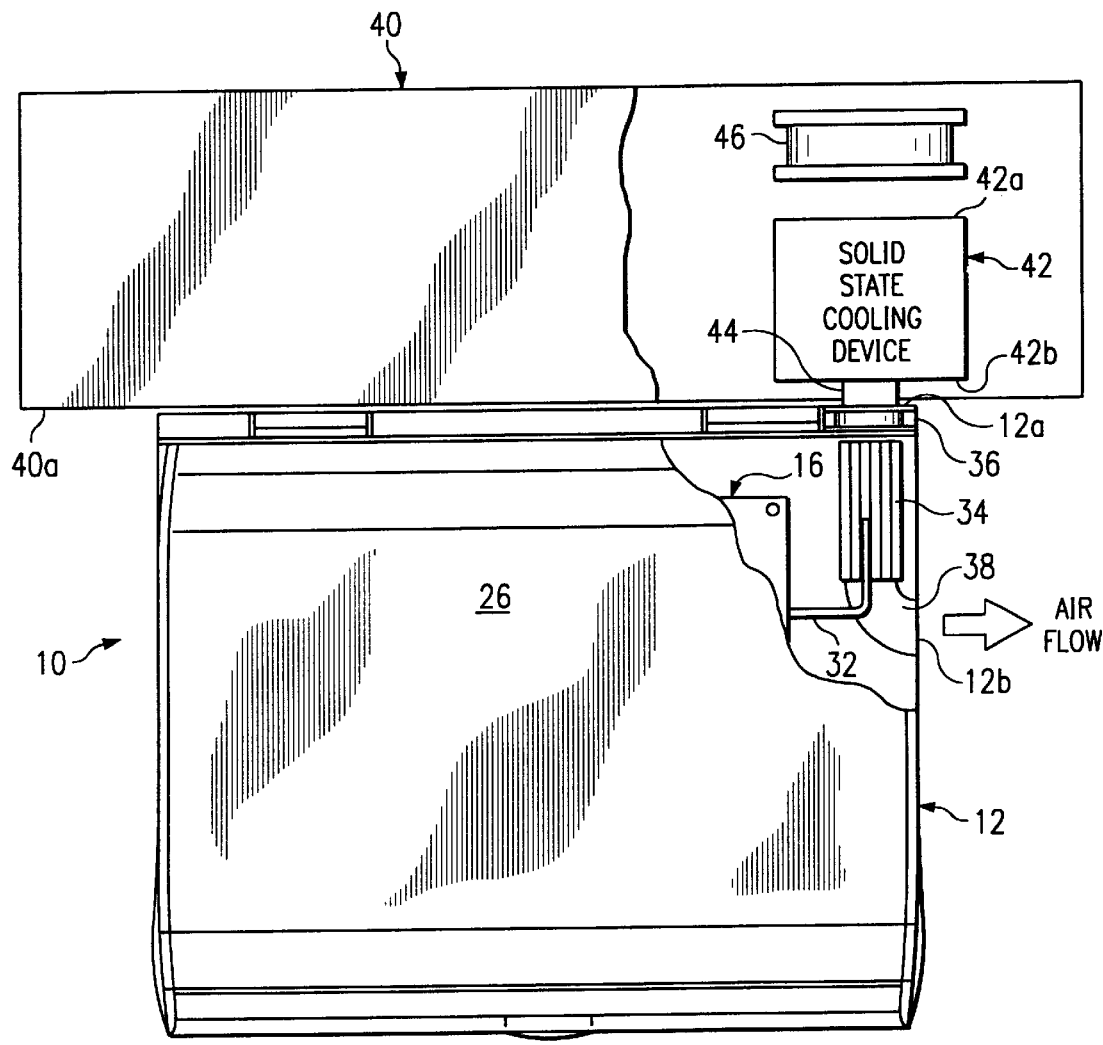
FIG. 3 is a top plan view of the computer of FIGS. 1 and 2 shown docked to a docking device.

With reference to FIG. 3, in the event it is desired to use the computer 10 in a high performance mode, a docking device 40 is provided. The docking device 40 can be in the form of a port replicator, a docking station, or the like, and functions to enable the computer 10 to be easily connected to a monitor, a regular keyboard, and one or more peripheral devices. To this end cooperating connectors (not shown) are provided on the rear end of the computer chassis 12 and the leading, or front, face 40a of the chassis of the docking device 40. Since the docking device 40 is conventional in this respect, it will not be described any further.

According to a feature of the present invention, a cooling device 42 is provided in the chassis of the docking device 40. The cooling device 42 is preferably a conventional solid state device commonly referred to as a "Peltier" design not unlike the cooling devices often used to cool thermos containers, coolers, and the like. The cooling device 42 has a "hot" side 42a and a "cold" side 42b, and is mounted in the chassis of the docking device 40 with the cold side extending towards the front of the latter chassis. An exhaust fan is 46 is also provided in the rear portion of the chassis of the docking device 40 adjacent the hot side 42a of the cooling device 42, and is adapted to exhaust hot air generated by the cooling device to atmosphere through an appropriate outlet formed in the rear wall of the latter chassis.

A duct 44 extends from the cold side 42b of the cooling device 42, through aligned openings in the chassis of the cooling device and the chassis of the docking device 40, and projects slightly outwardly from the latter chassis. The duct 44 transfers cool air from the cold side 42b of the cooling device to the computer 10 in a manner to be described.

As a result of the foregoing, the computer 10 can be operated in an undocked, mode as shown in FIG. 2, in which the fan 36 passes ambient air in a flow path from the inlet 12b through the duct 38, across the heat sink 34 before it is exhausted to atmosphere through the outlet 12a. The heat from the processor 16 is transferred to the heat sink 34 by the heat pipe 32, and dissipated by the heat sink. This heat is transferred to the ambient air flowing in the above manner, thus reducing the operating temperature of the processor.

When it is desired to operate the computer in a docked, higher performance, mode that produces more heat, the computer 10 is docked to the docking device 40 in the manner described above and as shown in FIG. 3. The fan 36 is switched to operate in a mode in which the direction of rotation of its blades is reversed from that described above. In this mode, the fan 36 pulls air from the cooling device 42 in the docking station 40, through the duct 44, into and through the outlet 12a of the chassis 12. The air then passes in a flow path across the heat sink 34, through the duct 38, and out the air inlet 12b as shown by the arrow in FIG. 3. The heat from the processor 16 transferred to the heat sink 34 by the heat pipe 32, and dissipated by the heat sink, is transferred to the cool air flowing in the above manner, thus significantly reducing the operating temperature of the processor. This enables the processor 16 to operate at a higher performance level and yet within its prescribed operating temperature, and thus permits increased performance from the computer 10.

Therefore, the portable computer of the present disclosure is provided with an internal cooling system that cools the computer in its undocked, or stand-alone, operating mode and can be utilized to permit additional cooling for higher performance when the computer is docked.

It is understood that variations may be made in the foregoing without departing from the scope of the invention. For example, the embodiment described above is not limited to cooling the processor of the computer, but is equally applicable cooling any internal component of the computer or to simply removing heat form the interior of the computer chassis. Also the cooling technique of the present embodiment is not limited to use with the particular type of portable computer described above by means of example, but is equally applicable to any type of self-contained computer, data processing unit, and/or storage device. It is also understood that the embodiment described above is intended to illustrate rather than limit the invention, and that the embodiment can take many other forms within the scope of the invention.

What is claimed is:

1. A computer comprising a chassis having an air inlet and an air outlet; at least one processor disposed in the chassis; at least one memory disposed in the chassis; an air duct disposed in the chassis and registering with the inlet and the outlet; a fan for passing ambient air from the inlet, through the air duct, and out the outlet; a heat sink disposed in the air duct; and a heat pipe disposed in the chassis and extending from the air duct to an area in the chassis for transferring heat from the area to the air duct so that the fan discharges the heat through the outlet.

2. The computer of claim 1 wherein the processor is disposed in the area of the chassis so that heat is removed from the processor.

3. The computer of claim 1 wherein the chassis has a rear wall and at least one side wall, wherein the outlet extends through the rear wall, and wherein the fan is mounted on the rear wall.

4. The computer of claim 3 wherein the inlet extends through a side wall of the chassis.

5. The computer of claim 1 wherein the heat transferred by the heat pipe from the area to the air duct is dissipated by the heat sink before being discharged from the outlet.

6. The computer of claim 5 wherein the rotation of the fan is reversible to pass the air from the outlet, through the air duct, and to the inlet for discharge from the inlet.

7. The computer of claim 6 further comprising a source of cool air disposed externally of the chassis, the fan being adapted to pass the cool air through the outlet and the air duct to the inlet.

8. The computer of claim 7 wherein the cool air source is a docking station for the computer.

9. The computer of claim 8 wherein the docking station comprises a chassis adapted to receive the computer chassis in a docking relationship and having an outlet, and a cooling device disposed in the docking device chassis, the fan being adapted to flow the cool air from the cooling device, through the docking device outlet, and through the outlet of the computer chassis.

10. A portable computer/docking assembly comprising
   a portable computer comprising:
      a chassis having an inlet and an outlet;
      at least one processor disposed in the chassis;
      at least one memory disposed in the chassis;
   a docking device comprising:
      a chassis adapted to receive the computer chassis in a docking relationship, and
      a cooling device disposed in the chassis of the docking device; and
   a fan adapted to pass cool air from the cooling device, through the inlet and into a flow path extending from the inlet, through the computer chassis and to the outlet;
   a heat sink disposed in the computer chassis in the flow path; and
   a heat pipe disposed in the computer chassis and extending from the heat sink to an area in the computer chassis outside the flow path for transferring heat from the area to the heat sink and to the cool air to reduce the temperature in the area.

11. The assembly of claim 10 further comprising an air duct disposed in the computer chassis, extending in the flow path, and registering with the inlet and the outlet, the heat sink being disposed in the air duct.

12. The assembly of claim 11 wherein the heat pipe extends through the air duct.

13. The assembly of claim 10 wherein the processor is disposed in the area of the chassis so that heat is removed from the processor.

14. The assembly of claim 10 wherein the heat transferred by the heat pipe from the area to the heat sink is dissipated by the heat sink before being discharged from the outlet.

15. The assembly of claim 10 wherein the computer chassis has a rear wall and at least one side wall, wherein the inlet extends through the rear wall, and wherein the fan is mounted on the rear wall.

16. The assembly of claim 15 wherein the outlet of the computer chassis extends through a side wall of the latter chassis.

17. The assembly of claim 10 wherein the rotation of the fan is reversible to pass ambient air from the outlet, through the flow path, and to the inlet for discharge from the inlet.

18. A method of cooling a computer comprising the steps of providing a docking station for receiving the computer in a docking relationship and for providing a source of cool air, passing the cool air from the docking station and through a flow path in the computer chassis, discharging the cool air from the chassis, disposing a heat sink in the flow path, extending a heat pipe from an area in the chassis outside the flow path to the heat sink for transferring heat from the area to the heat sink for dissipation by the heat sink before the heat is discharged during the step of discharging.

19. The method of claim 18 wherein a processor is disposed in the area of the chassis so that heat is removed from the processor.

20. The method of claim 18 further comprising the step of providing a cooling device in the docking station, the fan passing the cool air from the cooling device, through an outlet in the chassis of the docking station, to the inlet of the computer chassis, and through the flow path.

21. A method of cooling a computer comprising the steps of docking the chassis of the computer to a docking station having a cooling device; passing cool air from the cooling device into the computer chassis, through a flow path in the chassis, and to an outlet in the chassis for cooling the chassis; and extending a heat pipe from an area in the chassis outside the flow path to a heat sink disposed in the flow path for transferring heat from the area to the heat sink so that the heat is discharged from the outlet during the step of passing.

22. The method of claim 21 wherein the cool air is passed from the cooling device, through an outlet in the chassis of the docking station, into an inlet in the computer chassis, and through the flow path for discharge through the outlet in the computer chassis.

23. The method of claim 21 wherein a processor is disposed in the area of the chassis so that heat is removed from the processor.

24. The method of claim 21 wherein the heat transferred by the heat pipe from the area to the heat sink is dissipated by the heat sink before being discharged from the outlet.

25. The method of claim 21 further comprising the step of reversing the rotation of the fan to pass the air from the outlet of the computer chassis, through the flow path, and to the inlet of the computer chassis for discharge from the inlet.

26. A method of cooling a computer comprising the steps of mounting a fan to the computer chassis, rotating the fan in a first direction for passing ambient air in a flow path from a first opening in the computer chassis, through the chassis, and out a second opening in the chassis to cool the chassis, docking the chassis to a docking station having a source of cool air, rotating the fan in a second direction opposite the direction of rotation in the first direction to pass the cool air in the flow path from the second opening, through the chassis, and out the first opening in the chassis to cool the chassis, and extending a heat pipe from an area in the chassis outside the flow path to a heat sink disposed in the flow path for transferring heat from the area to the heat sink so that the heat is discharged from the chassis.

27. The method of claim 26 wherein a processor is disposed in the area of the chassis so that heat is removed from the processor.

28. The method of claim 26 wherein the heat transferred by the heat pipe from the area to the heat sink is dissipated by the heat sink before being discharged from the chassis.

* * * * *